(12) United States Patent
Wu et al.

(10) Patent No.: US 8,880,919 B2
(45) Date of Patent: Nov. 4, 2014

(54) METHOD AND DEVICE FOR PROVIDING LOW POWER CONSUMPTION SERVICES AND COMMUNICATION SYSTEM

(75) Inventors: Gengshi Wu, Shenzhen (CN); Jin Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 273 days.

(21) Appl. No.: 13/564,494

(22) Filed: Aug. 1, 2012

(65) Prior Publication Data

US 2012/0297223 A1 Nov. 22, 2012

Related U.S. Application Data

(63) Continuation of application No. PCT/CN2010/079566, filed on Dec. 8, 2010.

(30) Foreign Application Priority Data

Feb. 2, 2010 (CN) .......................... 2010 1 0105329

(51) Int. Cl.
*G06F 1/32* (2006.01)
*H04B 7/185* (2006.01)
*H04M 1/00* (2006.01)
*H04W 52/02* (2009.01)

(52) U.S. Cl.
CPC ................................ *H04W 52/0212* (2013.01)
USPC ............................ 713/320; 370/318; 455/574

(58) Field of Classification Search
CPC ................................................ H04W 52/0212
USPC ............................ 713/320; 370/318; 455/574
See application file for complete search history.

(56) References Cited

U.S. PATENT DOCUMENTS 6,226,281 B1 * 5/2001 Cordier et al. ................ 370/335
8,364,193 B1 * 1/2013 Pawar et al. .................. 455/522

(Continued)

FOREIGN PATENT DOCUMENTS

CN 1404321 A 3/2003
CN 1864426 A 11/2006

(Continued)

OTHER PUBLICATIONS

Office Action issued in corresponding Chinese Patent Application No. 201010105329.6, mailed Jan. 18, 2012.

(Continued)

*Primary Examiner* — Stefan Stoynov
(74) *Attorney, Agent, or Firm* — Brinks Gilson & Lione

(57) ABSTRACT

A method and a device for providing low power consumption services and a communication system are provided in the embodiments of the present disclosure. The method includes: receiving a low power consumption request sent by a terminal; when determining that the low power consumption request is supported, sending a first configuration parameter indicating that the low power consumption request is supported to a base station, so that the base station performs low power consumption communication with the terminal according to the first configuration parameter; and sending acknowledgement information indicating that the low power consumption request is supported to the terminal, in which the acknowledgement information carries a second configuration parameter, so that the terminal performs low power consumption communication with the base station according to the second configuration parameter. In this way, a network side provides services with different power consumption for different terminals according to requirements of terminals.

12 Claims, 9 Drawing Sheets

(56) References Cited

U.S. PATENT DOCUMENTS

| | | |
|---|---|---|
| 2003/0045320 A1 | 3/2003 | Tanno et al. |
| 2004/0072545 A1* | 4/2004 | Hamalainen et al. ......... 455/101 |
| 2005/0085279 A1 | 4/2005 | Aoki |
| 2007/0057767 A1 | 3/2007 | Sun et al. |
| 2007/0143637 A1 | 6/2007 | Tsai |
| 2007/0297438 A1 | 12/2007 | Meylan et al. |
| 2008/0186892 A1 | 8/2008 | Damnjanovic |
| 2010/0135208 A1 | 6/2010 | Ishii et al. |

FOREIGN PATENT DOCUMENTS

| | | |
|---|---|---|
| CN | 101606426 A | 12/2009 |
| CN | 101801072 A | 8/2010 |
| WO | WO 2008/136294 A1 | 11/2008 |
| WO | WO 2009/063417 A1 | 5/2009 |

OTHER PUBLICATIONS

International Search Report and Written Opinion of the International Searching Authority issued in corresponding PCT Patent Application No. PCT/CN2010/079566, mailed Mar. 10, 2011.

Extended European Search Report issued in corresponding European Patent Application No. 10845117.0, mailed Apr. 5, 2013.

* cited by examiner

METHOD AND DEVICE FOR PROVIDING LOW POWER CONSUMPTION SERVICES AND COMMUNICATION SYSTEM

CROSS-REFERENCE TO RELATED APPLICATIONS

This application is a continuation of International Application No. PCT/CN2010/079566, filed on Dec. 8, 2010, which claims priority to Chinese Patent Application No. 201010105329.6, filed on Feb. 2, 2010, both of which are hereby incorporated by reference in their entireties.

FIELD

The present disclosure relates to the field of communications technologies, and in particular, to a method and a device for providing low power consumption services and a communication system.

BACKGROUND

In the field of communications technologies, with ever-increasing functions of a terminal, the terminal has growing energy requirements. However, users' requirements for portability of the terminal are limited by the energy supply of the terminal. Therefore, it is a main design objective for the terminal to reduce power consumption of the terminal as much as possible while satisfying the users' requirements for performance of the terminal, so as to solve the contradiction between high performance and limited battery power of the terminal.

Currently, methods for reducing power consumption of a terminal mainly focus on the design of an internal circuit of the terminal. The methods are as follows. 1. A very large scale integration method is used to design a chip of the terminal to integrate hardware circuits of the terminal into one chip as much as possible. 2. A use condition of the terminal is monitored, and power supplies of parts that do not need to be started are turned off so as to achieve the purpose of reducing power consumption. For example, a display and unnecessary peripherals are turned off in time, a transmitting circuit is turned off in an idle state, or the like.

During the implementation of the present disclosure, the inventors find that the prior art has at least the following problem. Communication behaviors of the terminal after power-on are mainly decided by a network side, while the power consumption of the terminal depends, to a certain extent, on the communication behaviors decided by the network side, for example, the number of paging times, a method for searching for signal strength of surrounding network, a time interval between interruptions of service transmission, and the like. However, the prior art mainly reduces power consumption of the terminal by optimizing the design of the internal circuit of the terminal, but does not pay any attention to the power consumption caused by the communication behaviors of the terminal with the network side.

SUMMARY

Embodiments of the present disclosure provide a method and a device for providing low power consumption services and a communication system, so that a network side can provide services with different power consumption for different terminals according to the terminals' selections, thereby reducing power consumption caused by communication between a terminal and a network.

An embodiment of the present disclosure provides a method for providing low power consumption services, which includes: receiving a low power consumption request sent by a terminal; when determining that the low power consumption request is supported, sending a first configuration parameter indicating that the low power consumption request is supported to a base station, so that the base station performs low power consumption communication with the terminal according to the first configuration parameter; and sending acknowledgement information indicating that the low power consumption request is supported to the terminal, in which the acknowledgement information carries a second configuration parameter, so that the terminal performs low power consumption communication with the base station according to the second configuration parameter.

An embodiment of the present disclosure provides a device having a processor configured to provide low power consumption services. The device includes: a receiving module, configured to receive a low power consumption request sent by a terminal; a first configuration module, configured to, when it is determined that the low power consumption request is supported, send a first configuration parameter indicating that the low power consumption request is supported to a base station, so that the base station performs low power consumption communication with the terminal according to the first configuration parameter; and a second configuration module, configured to send acknowledgement information indicating that the low power consumption request is supported to the terminal, in which the acknowledgement information carries a second configuration parameter, so that the terminal performs low power consumption communication with the base station according to the second configuration parameter.

An embodiment of the present disclosure further provides a terminal having a processor. The terminal includes: a request module, configured to send a low power consumption request to a core network; and a second configuration parameter receiving module, configured to, when a network side supports the low power consumption request, receive acknowledgement information that is sent by the core network and indicates that the low power consumption request is supported, in which the acknowledgement information carries a second configuration parameter, so that the terminal performs low power consumption communication with a base station according to the second configuration parameter.

An embodiment of the present disclosure further provides a communication system, which includes the device for providing low power consumption services, the terminal, and a base station, in which the base station is configured to receive a first configuration parameter which is sent by the device for providing low power consumption services and which indicates that the low power consumption request is supported, so as to perform low power consumption communication with the terminal according to the first configuration parameter.

In the method and the device for providing low power consumption services and the communication system provided in the embodiments of the present disclosure, after the terminal actively initiates a low power consumption request to the core network, the core network configures, according to low power consumption requests of different terminals, parameters corresponding to the low power consumption requests for the terminal and the base station to which the terminal belongs, so as to provide services with different power consumption for different terminals. In this way, the purpose of reducing, according to the terminal's selection, power consumption caused by communication between the terminal and the network is achieved.

DETAILED DESCRIPTION OF THE EMBODIMENTS

In embodiments of the present disclosure, a terminal can select a power consumption mode on its own, and a network side provides various power consumption modes for the terminal according to requests of the terminal.

Figure 1:
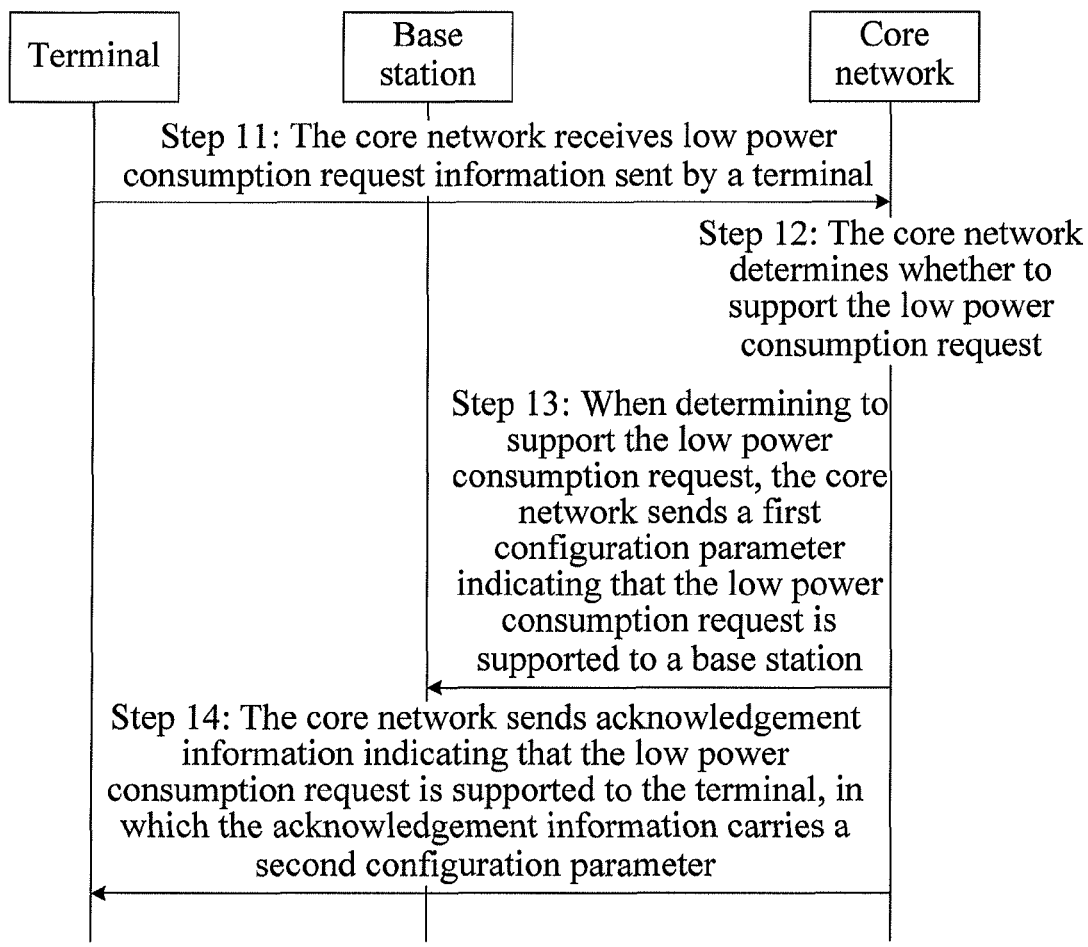
FIG. 1 is a flow chart of Embodiment 1 of a method for providing low power consumption services in the present disclosure.

FIG. 1 is a flow chart of Embodiment 1 of a method for providing low power consumption services in the present disclosure. A subject executing each step in this embodiment is a core network. As shown in FIG. 1, this embodiment includes the following steps.

Step 11: The core network receives a low power consumption request sent by a terminal.

The terminal may provide a user with an interface for selecting a power consumption mode, and a specific parameter value of requesting low power consumption, for example, a setting value of a paging period, a setting value of a fixed interval scheduling period, or the like, is provided on the interface. For a user unfamiliar with communications technologies, a power consumption mode selection interface may be provided. For example, three modes including a low power consumption mode, a relatively low power consumption mode, and an extremely low power consumption mode are provided on the interface, and meanwhile, specific standby time, working time, power consumption, and other values in the three modes may also be provided, or a prompt may be given to the user that service performance of the terminal may be degraded if the terminal is selected to work in this mode, and so on. After relevant parameters of the low power consumption request are selected, the terminal sends the low power consumption request to the core network through signaling.

The low power consumption request may include, but not limited to, any one or a combination of the following information:

first request information requesting extending a paging period; second request information requesting providing a current cell type or a measurement period for the terminal; third request information requesting extending a scheduling period; fourth request information requesting lowering an upper limit of transmit power; and fifth request information requesting residing in a cell forward access channel state. A network may provide information such as the current cell type and the measurement period through cell broadcast, for the terminal to read upon cell update/handover, or the network may also directly send the information to the terminal requesting the information.

Step 12: The core network determines whether to support the low power consumption request.

After receiving the low power consumption request of the terminal, the core network compares a type of the low power consumption request with corresponding configuration in the network side to determine whether to support the low power consumption request of the terminal.

Step 13: When determining to support the low power consumption request, the core network sends a first configuration parameter indicating that the low power consumption request is supported to a base station.

When determining not to support the low power consumption request sent by the terminal, the core network directly sends request failure information to the terminal to notify the terminal that the network side does not support the low power consumption request.

After determining to support the low power consumption request of the terminal, the core network sends a first configuration parameter indicating that the low power consumption request is supported to the base station to configure relevant parameters of the base station, so that the base station provides the terminal with a communication service corresponding to the low power consumption request.

Step 14: The core network sends acknowledgement information indicating that the low power consumption request is supported to the terminal, in which the acknowledgement information carries a second configuration parameter.

After determining to support the low power consumption request of the terminal, the core network sends a second configuration parameter indicating that the low power consumption request is supported to the terminal to configure relevant parameters of the terminal, so that the terminal performs low power consumption communication with the base station according to the relevant parameters.

There is no precedence in time for step 13 and step 14.

In this embodiment, after the terminal actively initiates a low power consumption request to the core network, the core network configures, according to low power consumption requests of different terminal users, parameters corresponding to the low power consumption requests for the terminal and the base station to which the terminal belongs, so as to provide services with different power consumption for different terminals. In this way, power consumption caused by communication between the terminal and the network can be reduced according to the terminal's selection.

Figure 2:
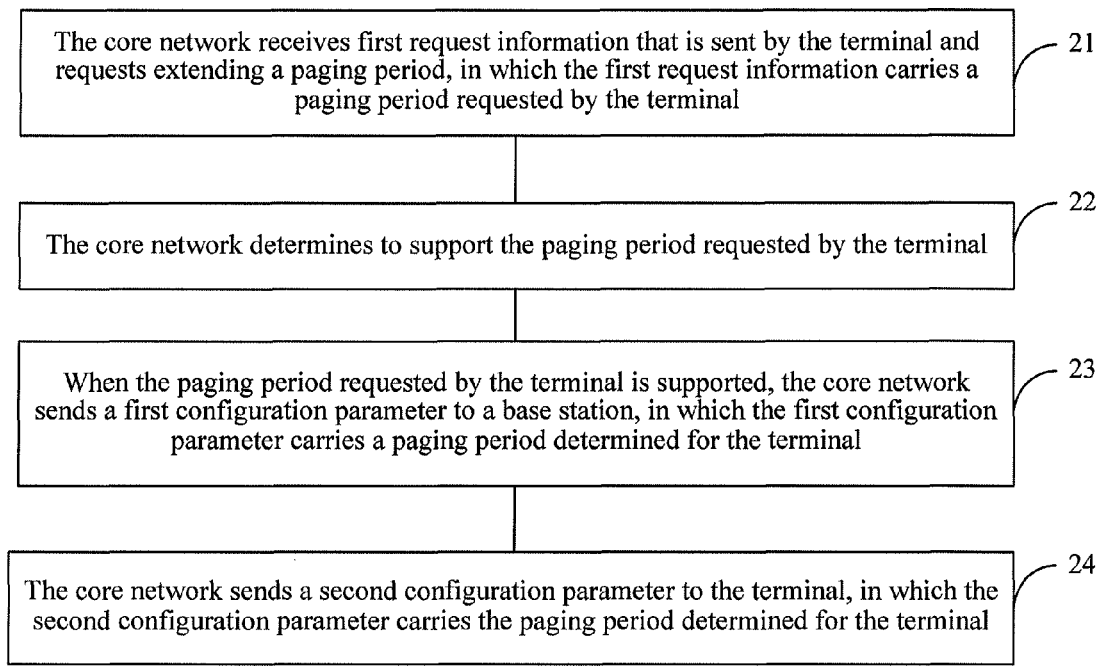
FIG. 2 is a flow chart of Embodiment 2 of the method for providing low power consumption services in the present disclosure.

FIG. 2 is a flow chart of Embodiment 2 of the method for providing low power consumption services in the present disclosure. In this embodiment, a low power consumption request sent by a terminal to a core network is the aforementioned first request information, that is, the terminal requests extending a paging period. As shown in FIG. 2, this embodiment includes the following steps.

Step 21: The core network receives first request information that is sent by the terminal and requests extending a paging period, in which the first request information carries a paging period requested by the terminal.

The paging period refers to the shortest time interval at which a base station pages the terminal. The longer the paging period, the longer the time interval at which the terminal receives an instruction of the base station, and accordingly, the lower the power consumption of the terminal. The terminal may request a network side to give a service with a long paging period according to power consumption requirements so as to reduce its own power consumption, while sacrificing some paging performance of the terminal. The terminal sends the first request information with a request for extending the paging period to the core network through signaling (for example, radio resource connection establishment request signaling, measurement signaling, or the like; or new signaling for requesting extending a paging period may also be designed), in which the first request information carries a paging period selected by the terminal.

Step 22: It is determined whether to support the paging period requested by the terminal.

The core network determines, according to a paging period set by the network side, whether to support the paging period requested by the terminal. For example, the paging period configured by the network is within 810 ms, while the paging period requested by the terminal is 920 ms, so the network side does not support the paging period requested by the terminal.

After determining to support the extension of the paging period for the terminal, the core network continues to perform step 23 and step 24; otherwise, the core network sends request failure information to the terminal to notify the terminal that the core network does not support extending the paging period.

Step 23: When the paging period requested by the terminal is supported, the core network sends a first configuration parameter to a base station, in which the first configuration parameter carries a paging period determined for the terminal.

After determining that the extension of the paging period for the terminal is supported, the core network sends the first configuration parameter through signaling (for example, radio resource connection establishment response signaling, handover signaling, or the like; or new signaling, namely, response signaling for extending the paging period, may also be designed) to the base station that the terminal is currently connected to, so that the base station supports extending the time interval at which the terminal is paged. After receiving the first configuration parameter sent by the core network, the base station extends, according to the first configuration parameter, the time interval at which the terminal is paged.

Currently, the paging period of the base station is configurable, but paging periods of all terminals in one cell are the same. In this embodiment, the base station can provide a service with a different paging period for each terminal in one cell. Currently, the paging period is 640 ms-5120 ms. To reduce power consumption, the paging period may be set to once per day, and when the terminal is paged every time, the terminal may perform local time calibration to be consistent with system time on the base station.

A method for providing different paging periods for different terminals is: setting different paging times for different terminals, for example, the number of paging times for a certain terminal is set to 20 times that of paging times for another terminal, so that a period at which the terminal receives a paging message is 20 times shorter than that of the another terminal. There may be other implementation methods, which are not limited in the embodiment of the present disclosure.

Step 24: A second configuration parameter is sent to the terminal, in which the second configuration parameter carries the paging period determined for the terminal.

The core network sends the second configuration parameter to the terminal through signaling (for example, radio resource connection establishment response signaling, handover signaling, or the like; or new signaling, namely, response signaling for extending the paging period, may also be designed). The time interval at which the terminal receives the paging information of the base station is extended, and the number of times of communication between the terminal and the base station is reduced, thereby reducing power consumption of the terminal.

In this embodiment, after receiving a request that is for extending a paging period and is actively initiated by the terminal, the core network configures corresponding parameters for the terminal and the base station according to the request, so that the base station extends the time interval at which the terminal is paged, and the number of times of communication between the terminal and the base station is reduced, thereby reducing power consumption caused by communication between the terminal and the network.

Figure 3:
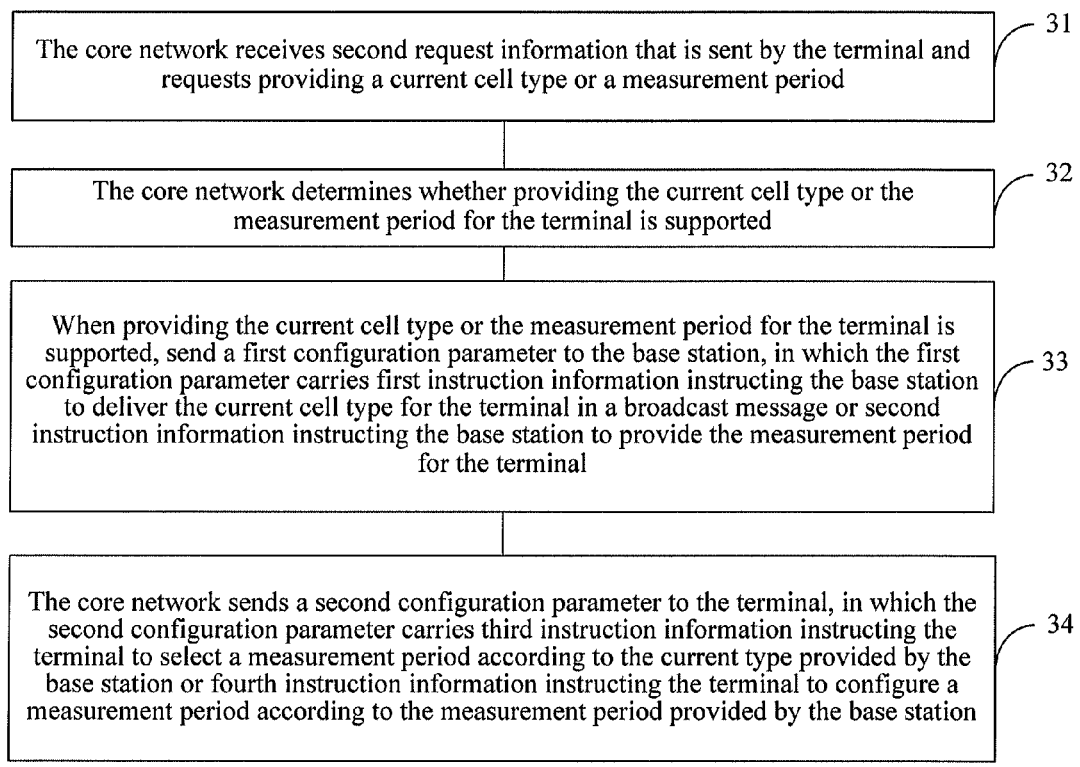
FIG. 3 is a flow chart of Embodiment 3 of the method for providing low power consumption services in the present disclosure.

FIG. 3 is a flow chart of Embodiment 3 of the method for providing low power consumption services in the present disclosure. In this embodiment, a low power consumption request sent by a terminal to a core network is the aforementioned second request information, that is, the terminal requests providing a current cell type or a measurement period. As shown in FIG. 3, this embodiment includes the following steps.

Step 31: The core network receives second request information that is sent by the terminal and requests providing a current cell type or a measurement period.

The terminal sends the second request information to the core network through signaling (for example, radio resource connection establishment request signaling, measurement signaling, or the like; or new signaling, namely, the signaling for requesting providing a cell type or a measurement period, may also be designed), to request providing a current cell type or a measurement period.

The base station may provide the cell type or the measurement period for the terminal through cell broadcast, for the terminal to read upon cell update or handover; the base station may also directly send the cell type or the measurement period to the terminal that requests the information. When the terminal performs the cell update or handover, the terminal may select a measurement period according to a current cell type after receiving cell type information broadcasted by the base station, so as to avoid frequent cell handover and signal measurement. The current cell type may be: large cell, dense cell, fast moving cell, or the like. Or, when the terminal performs the cell update or handover, the terminal configures its own measurement period according to the measurement period provided by the base station.

Step 32: The core network determines whether providing the current cell type or the measurement period for the terminal is supported.

After determining that providing the current cell type or the measurement period for the terminal is supported, the core network continues to perform step 33 and step 34; otherwise, the core network sends request failure information to the terminal to notify the terminal that the core network does not support providing the terminal with the current cell type or the measurement period.

Step 33: When providing the current cell type or the measurement period for the terminal is supported, the core network sends a first configuration parameter to the base station, in which the first configuration parameter carries first instruction information instructing the base station to deliver the current cell type for the terminal in a broadcast message or second instruction information instructing the base station to provide the measurement period for the terminal.

The core network sends the first configuration parameter to the base station through signaling (for example, radio resource connection establishment response signaling, handover signaling, or the like; or new signaling may also be designed), where the first configuration parameter carries the first instruction information or the second instruction information. After receiving the first configuration parameter, the base station delivers information related to the cell type in time in cell broadcast according to the first instruction information, and delivers the measurement period to the terminal according to the second instruction information.

Step 34: The core network sends a second configuration parameter to the terminal, in which the second configuration parameter carries third instruction information instructing the terminal to select a measurement period according to a current type provided by the base station or fourth instruction information instructing the terminal to configure a measurement period according to the measurement period provided by the base station.

The core network sends the second configuration parameter to the terminal through signaling (for example, radio resource connection establishment response signaling, handover signaling, or the like; or new signaling may also be designed).

In this embodiment, after receiving information that is actively initiated by the terminal and requests providing a current cell type or a measurement period, the core network configures corresponding parameters for the terminal and the base station according to the request, so that the base station provides current cell type information for the terminal in cell broadcast or directly provides the measurement period for the terminal. The terminal selects a measurement period on its own according to the current cell type or configures a measurement period according to the measurement period directly provided by the base station, so as to avoid frequent cell handover and signal measurement, thereby reducing power consumption caused by communication between the terminal and the network.

Figure 4A:
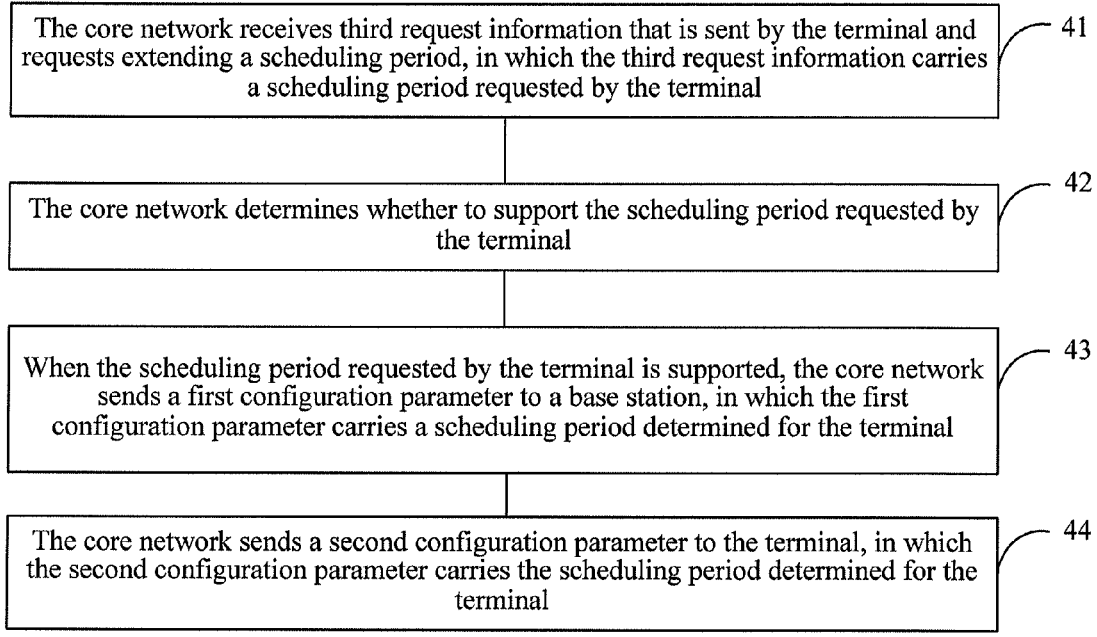
FIG. 4A is a flow chart of Embodiment 4 of the method for providing low power consumption services in the present disclosure.

FIG. 4A is a flow chart of Embodiment 4 of the method for providing low power consumption services in the present disclosure. In this embodiment, a low power consumption request sent by the terminal to the core network is the aforementioned third request information, that is, a terminal requests extending a scheduling period. As shown in FIG. 4A, this embodiment includes the following steps.

Step 41: A core network receives third request information that is sent by the terminal and requests extending a scheduling period, in which the third request carries a scheduling period requested by the terminal.

The terminal sends the third request information to the core network through signaling (for example, radio resource connection establishment request signaling, measurement signaling, or the like; or new signaling, namely, the signaling for requesting to extend a scheduling period, may also be designed). The scheduling period refers to a time interval at which a network side schedules the terminal to receive or send data. The longer the time interval at which the terminal receives or sends data, the lower the power consumption of the terminal.

The scheduling period includes: a discontinuous receive (Discontinuous Receive, DRx for short hereinafter) period, a discontinuous transmitting period (discontinuous transmitting, DTx for short hereinafter), and a continuous packet connectivity (Continuous Packet Connectivity, CPC for short hereinafter) period.

To reduce communication behaviors of the terminal with a base station, the DRx period, or DTx period, or CPC period may be extended. On every other DRx duration, the terminal turns off a receiver, and enters a sleep state with low power consumption. After a DRx duration elapses on an internal timer, the receiver is started. In addition, on every other DTx duration, the terminal turns off a transmitter, and enters a sleep state with low power consumption. After a DTx duration elapses on the internal timer of the terminal, the transmitter is started. Besides, the terminal continuously receives packet data on every other CPC duration.

Step 42: The core network determines whether to support the scheduling period requested by the terminal.

The core network determines, according to a scheduling period configured by the network, whether to support the scheduling period requested by the terminal. For example, the terminal requests a scheduling period of 10 ms, and if the scheduling period configured by the network is within 8 ms, it indicates that the core network does not support the scheduling period requested by the terminal.

After determining that the extension of the scheduling period for the terminal is supported, the core network continues to perform step 43 and step 44; otherwise, the core network sends request failure information to the terminal to notify the terminal that the core network does not support extending the scheduling period.

Step 43: When the scheduling period requested by the terminal is supported, a first configuration parameter is sent to a base station, in which the first configuration parameter carries a scheduling period determined for the terminal.

The core network sends the first configuration parameter to the base station through signaling (for example, radio resource connection establishment response signaling, handover signaling, or the like; or new signaling may also be designed).

Step 44: The core network sends a second configuration parameter to the terminal, in which the second configuration parameter carries the scheduling period determined for the terminal.

The core network sends the second configuration parameter to the terminal through signaling (for example, radio resource connection establishment response signaling, handover signaling, or the like; or new signaling may also be designed).

Figure 4B:
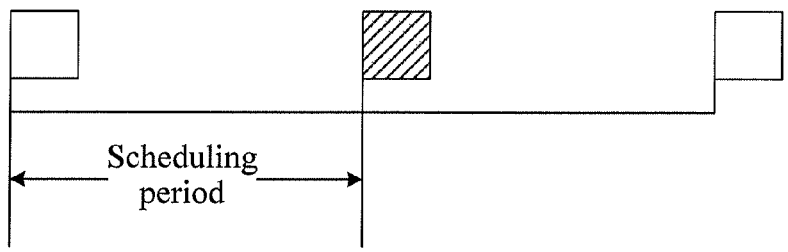
FIG. 4B is a schematic diagram of a scheduling period in Embodiment 4 of the method for providing low power consumption services in the present disclosure.

FIG. 4B is a schematic diagram of a scheduling period in Embodiment 4 of the method for providing low power consumption services in the present disclosure. As shown in FIG. 4B,  represents a single burst with data sent,  represents a single burst without data sent, and time between two single bursts represents a scheduling period. Each time the terminal sends or receives data, it is determined, according to whether there is data for sending or whether enough data exists in a buffer area, whether data needs to be sent or received. The longer the scheduling period, the lower the power consumption of the terminal, but service supporting capability of the terminal may be affected. For example, a throughput rate of the terminal and a delay that is for receiving or sending data and is of the terminal are affected. In this case, a method for increasing the throughput rate is as follows.

When the terminal requests extending the scheduling period, the core network provides a large data buffer area for the terminal in a storage area of the base station, and the amount of sent data is increased in a single burst (the time for the terminal to send or receive data when the scheduling period arrives) to satisfy service requirements and power consumption requirements of a user of the terminal.

In this embodiment, after receiving a request that is for extending a scheduling period and is actively initiated by the terminal, the core network configures corresponding parameters for the terminal and the base station according to the request, so that the base station supports the terminal in sending data to the base station or receiving data from the base station at a long time interval, so as to avoid frequent sending and receiving, thereby reducing power consumption caused by communication between the terminal and the network.

Figure 5:
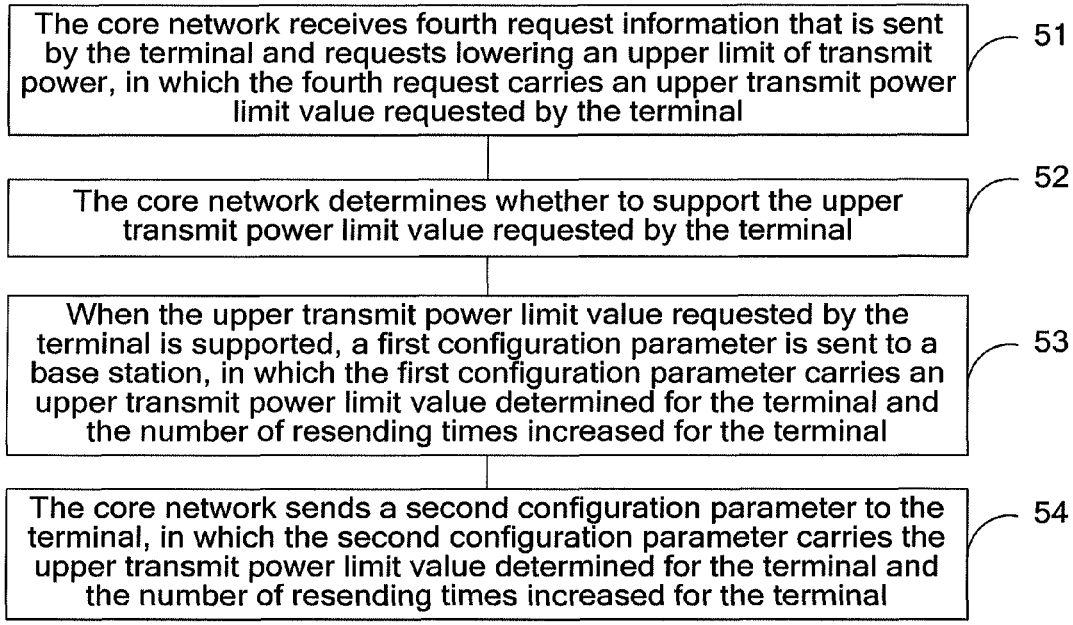
FIG. 5 is a flow chart of Embodiment 5 of the method for providing low power consumption services in the present disclosure.

FIG. 5 is a flow chart of Embodiment 5 of the method for providing low power consumption services in the present disclosure. In this embodiment, a low power consumption request sent by the terminal to the core network is the aforementioned fourth request information, that is, a terminal requests lowering an upper limit of transmit power. As shown in FIG. 5, this embodiment includes the following steps.

Step 51: The core network receives fourth request information that is sent by the terminal and requests lowering an upper limit of transmit power, in which the fourth request carries an upper transmit power limit value requested by the terminal.

The terminal sends the fourth request information to the core network through signaling (for example, radio resource connection establishment request signaling, measurement signaling, or the like; or new signaling, namely, the signaling for requesting to lower an upper limit of transmit power, may also be designed).

Step 52: The core network determines whether to support the upper transmit power limit value requested by the terminal.

The core network determines whether the upper transmit power limit value requested by the terminal is in the range of the terminal's upper transmit power limit value configured by the network, and if the upper transmit power limit value requested by the terminal is in the range of the terminal's upper transmit power limit value configured by the network, it indicates that the request of the terminal for lowering the upper transmit power limit value is supported. After determining to support the terminal in lowering the upper limit of transmit power, the core network continues to perform step 53 and step 54, otherwise, the core network sends request failure information to the terminal to notify the terminal that the network side does not support lowering the upper limit of transmit power.

Step 53: When the upper transmit power limit value requested by the terminal is supported, the core network sends a first configuration parameter to a base station, in which the first configuration parameter carries an upper transmit power limit value determined for the terminal and the number of resending times increased for the terminal.

The core network sends the first configuration parameter to the base station through signaling (for example, radio resource connection establishment response signaling, handover signaling, or the like; or new signaling may also be designed). When the core network allows the terminal to lower the upper limit of transmit power, the number of times of resending data may be increased for the terminal.

Step 54: The core network sends a second configuration parameter to the terminal, in which the second configuration parameter carries the upper transmit power limit value determined for the terminal and the number of resending times increased for the terminal.

In this embodiment, after receiving a request that is for lowering an upper limit of transmit power and is actively initiated by the terminal, the core network configures corresponding parameters for the terminal and the base station according to the request, so that the base station supports the terminal in working at low transmit power, thereby reducing power consumption caused by communication between the terminal and the network.

Figure 6:
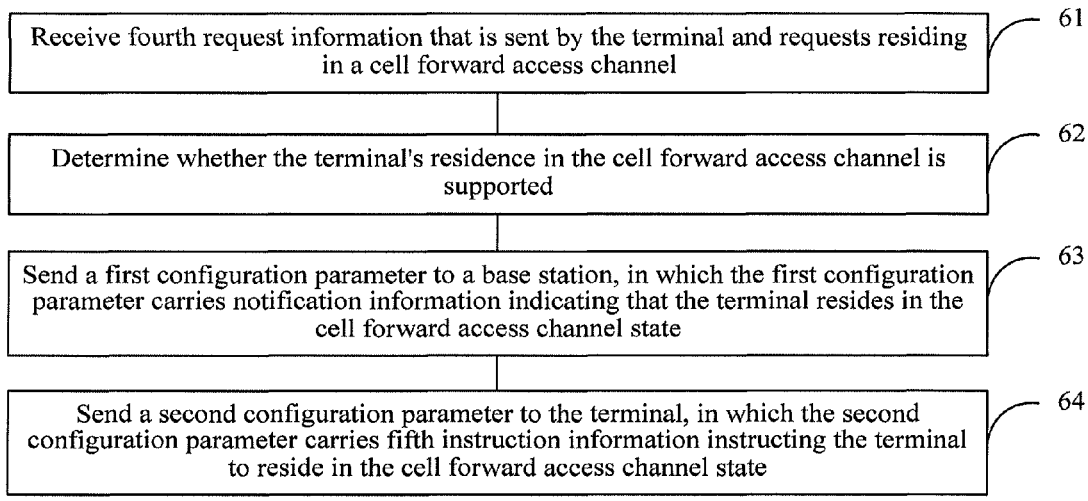
FIG. 6 is a flow chart of Embodiment 6 of the method for providing low power consumption services in the present disclosure.

FIG. 6 is a flow chart of Embodiment 6 of the method for providing low power consumption services in the present disclosure. In this embodiment, a low power consumption request sent by a terminal to a core network is the aforementioned fifth request information, that is, the terminal requests residing in a cell forward access channel state. As shown in FIG. 6, this embodiment includes the following steps.

Step 61: The core network receives fourth request information that is sent by the terminal and requests residing in a cell forward access channel.

The terminal sends the fourth request information to the core network through signaling.

Step 62: The core network determines whether to support the terminal's residence in the cell forward access channel.

Generally, the network allows the terminal in an idle state to reside in a cell forward access channel. After receiving the request of the terminal for residing in the cell forward access channel, the core network judges whether a current state of the terminal is IDLE, and if the current state of the terminal is IDLE, the core network allows the terminal to reside in the cell forward access channel. After determining that the terminal's residence in the cell forward access channel state is supported, the core network continues to perform step 63 and step 64; otherwise, the core network sends request failure information to the terminal to notify the terminal that the core network does not support residing in the cell forward access channel.

Step 63: A first configuration parameter is sent to a base station, in which the first configuration parameter carries notification information that the terminal resides in the cell forward access channel state.

The core network sends the first configuration parameter to the base station through signaling (for example, radio resource connection establishment response signaling, handover signaling, or the like; or new signaling may also be designed). When allowing the terminal to reside in the cell forward access channel state, the core network sends the first configuration parameter to the base station, and notifies, in the first configuration parameter, the base station that the terminal resides in the cell forward access channel state.

Step 64: The core network sends a second configuration parameter to the terminal, in which the second configuration parameter carries fifth instruction information instructing the terminal to reside in the cell forward access channel state.

The core network sends the second configuration parameter to the terminal through signaling (for example, radio resource connection establishment response signaling, handover signaling, or the like; or new signaling may also be designed).

The terminal requests residing in a cell forward access channel (Cell Forward Access Channel, Cell-FACH for short hereinafter) state. When the terminal resides in the cell Cell-FACH Cell, if service data is not activated over a period of time, the terminal enters a paging channel state, and in this state, power consumption of the terminal can be reduced.

In this embodiment, after receiving a request that is actively initiated by the terminal and requests residing in a cell forward access channel, the core network configures corresponding parameters for the terminal and the base station according to the request, so that the terminal resides in the cell forward access channel, thereby reducing power consumption caused by communication between the terminal and the network.

Figure 7:
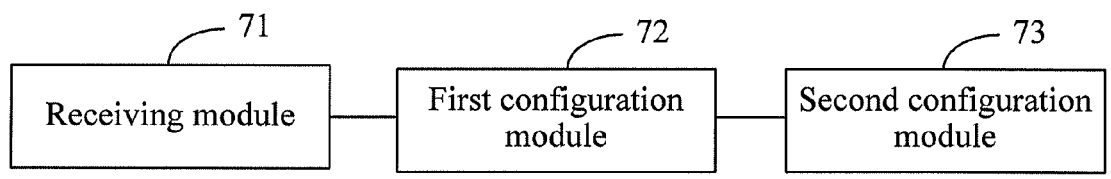
FIG. 7 is a schematic structural diagram of Embodiment 1 of a device for providing low power consumption services in the present disclosure.

FIG. 7 is a schematic structural diagram of Embodiment 1 of a device for providing low power consumption services in the present disclosure. As shown in FIG. 7, this embodiment includes a receiving module 71, a first configuration module 72, and a second configuration module 73.

The receiving module 71 is configured to receive a low power consumption request sent by a terminal; the first configuration module 72 is configured to, when it is determined that the low power consumption request is supported, send a first configuration parameter indicating that the low power consumption request is supported to a base station, so that the base station performs low power consumption communication with the terminal according to the first configuration parameter; and the second configuration module 73 is configured to, when it is determined that the low power consumption request is supported, send acknowledgement information indicating that the low power consumption request is supported to the terminal, in which the acknowledgement information carries a second configuration parameter, so that the terminal performs low power consumption communication with the base station according to the second configuration parameter.

Specifically, the receiving module 71 receives the low power consumption request sent by the terminal; the first configuration module sends a first configuration parameter indicating that the low power consumption request is supported to a base station after it is determined that the low power consumption request of the terminal is supported; after the base station obtains the first configuration parameter, the base station performs low power consumption communication with the terminal according to the first configuration parameter; after the first configuration module 72 sends the first configuration parameter to the base station, the second configuration module 73 sends acknowledgement information indicating that the low power consumption request is supported to the terminal, in which the acknowledgement information carries a second configuration parameter delivered for the terminal; and after the terminal receives the second configuration parameter, the terminal performs low power consumption communication with the base station according to the second configuration parameter.

The low power consumption request may include, but not limited to, any one or a combination of the following information:

first request information requesting extending a paging period, in which the first request information carries a paging period requested by the terminal; second request information requesting providing a current cell type or a measurement period for the terminal; third request information requesting extending a scheduling period, in which the third request information carries a scheduling period requested by the terminal, and the scheduling period is a time interval at which the network side schedules the terminal to send data or a time interval at which the network side schedules the terminal to receive data; fourth request information requesting lowering an upper limit of transmit power, in which the fourth request information carries an upper transmit power limit value requested by the terminal; and fifth request information requesting residing in a cell forward access channel state.

For working mechanisms of the modules in this embodiment, reference is made to the description in the embodiment corresponding to FIG. 1, which will not be described herein again.

Figure 8:
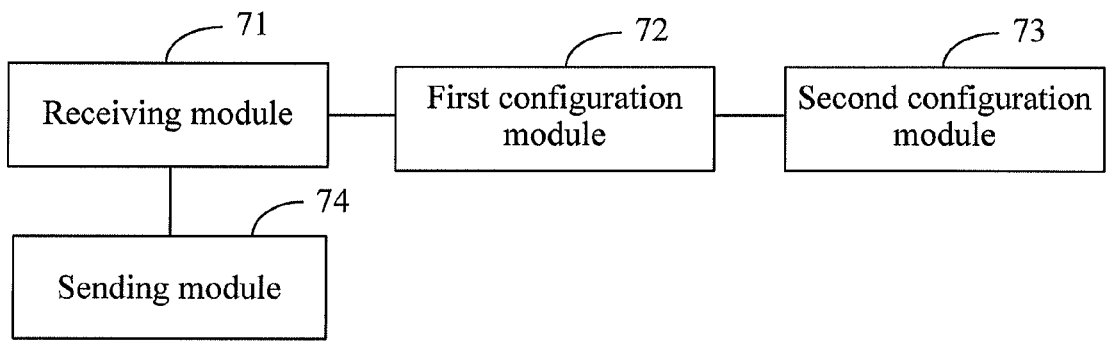
FIG. 8 is a schematic structural diagram of Embodiment 2 of the device for providing low power consumption services in the present disclosure.

As shown in FIG. 8, based on the embodiment corresponding to FIG. 7, the device for providing low power consumption services further includes a sending module 74. FIG. 8 is a schematic structural diagram of Embodiment 2 of the device for providing low power consumption services in the present disclosure.

The sending module 74 is configured to, when it is determined that the low power consumption request is not supported, send request failure information to the terminal to notify the terminal that the network side does not support the low power consumption request.

In this embodiment, after the receiving module 71 receives a low power consumption request actively initiated by the terminal to the core network, the second configuration module 73 and the first configuration module 72 respectively configure, according to low power consumption requests of different terminal users, parameters corresponding to the low power consumption requests for the terminal and the base station to which the terminal belongs, so as to provide services with different power consumption for different terminals. In this way, power consumption caused by communication between the terminal and the network can be reduced according to the terminal's selection.

Figure 9:
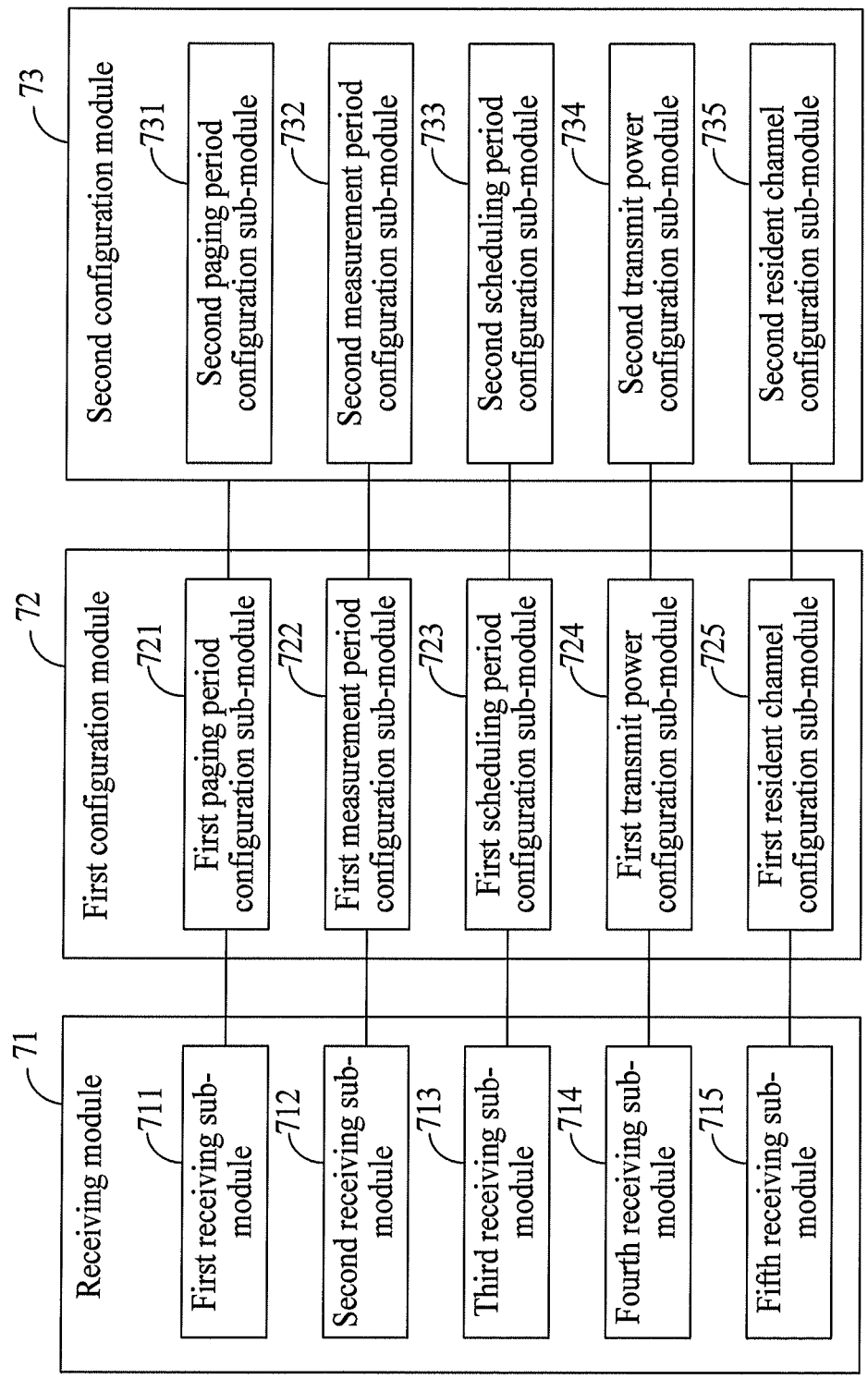
FIG. 9 is a schematic structural diagram of Embodiment 3 of the device for providing low power consumption services in the present disclosure.

FIG. 9 is a schematic structural diagram of Embodiment 3 of the device for providing low power consumption services in the present disclosure. As shown in FIG. 9, the receiving module 71 in FIG. 7 or FIG. 8 includes: a first receiving sub-module 711, a second receiving sub-module 712, a third receiving sub-module 713, a fourth receiving sub-module 714, and a fifth receiving sub-module 715.

As shown in the FIG. 9, the first configuration module 72 in FIG. 7 or FIG. 8 includes: a first paging period configuration sub-module 721, a first measurement period configuration sub-module 722, a first scheduling period configuration sub-module 723, a first transmit power configuration sub-module 724, and a first resident channel configuration sub-module 725.

As shown in FIG. 9, the second configuration module 73 in FIG. 7 or FIG. 8 includes: a second paging period configuration sub-module 731, a second measurement period configuration sub-module 732, a second scheduling period configuration sub-module 733, a second transmit power configuration sub-module 734, and a second resident channel configuration sub-module 735.

The first receiving sub-module 711 is configured to receive first request information that is sent by the terminal and requests extending a paging period, in which the first request information includes a paging period requested by the terminal. The first paging period configuration sub-module 721 is configured to, when it is determined that the core network supports the first request information received in the first receiving sub-module 711, send a first paging period configuration parameter indicating that the first request information is supported to the base station, in which the first paging period configuration parameter includes a paging period determined for the terminal. The second paging period configuration sub-module 731 is configured to, when it is determined that the core network supports the first request information received in the first receiving sub-module 711, send first acknowledgement information indicating that the first request information is supported to the terminal, in which the first acknowledgement information carries a second paging period configuration parameter, and the second paging period configuration parameter includes the paging period determined for the terminal.

For working mechanisms of the first receiving sub-module 711, the first paging period configuration sub-module 721, and the second paging period configuration sub-module 731, reference is made to the description in the embodiment corresponding to FIG. 2, which will not be described herein again.

The second receiving sub-module 712 is configured to receive second request information that is sent by the terminal and requests providing a current cell type or a measurement period for the terminal. The first measurement period configuration sub-module 722 is configured to, when it is determined that the core network supports the second request information received by the second receiving sub-module 712, send a first measurement period configuration parameter indicating that the low power consumption request is supported to the base station, in which the first measurement period configuration parameter includes first instruction information instructing the base station to provide the current cell type for the terminal in a broadcast message or second instruction information instructing the base station to provide the measurement period for the terminal. The second measurement period configuration sub-module 732 is configured to, when the core network supports the second request information received by the second receiving sub-module 712, send second acknowledgement information indicating that the second request information is supported to the terminal, in which the second acknowledgement information carries a second measurement period configuration parameter, and the second measurement period configuration parameter includes third instruction information instructing the terminal to select a measurement period according to a current type provided by the base station or fourth instruction information instructing the terminal to configure a measurement period according to the measurement period provided by the base station.

For working mechanisms of the second receiving sub-module 712, the first measurement period configuration sub-module 722, and the second measurement period configuration sub-module 732, reference is made to the description in the embodiment corresponding to FIG. 3, which will not be described herein again.

The third receiving sub-module 713 is configured to receive third request information that is sent by the terminal and requests extending a scheduling period, in which the scheduling period is a time interval at which the core network schedules the terminal to send data or a time interval at which the network side schedules the terminal to receive data, and the third request information carries a scheduling period requested by the terminal. The first scheduling period configuration sub-module 723 is configured to, when it is determined that the core network supports the third request information received by the third receiving sub-module 713, send a first scheduling period configuration parameter indicating that the low power consumption request is supported to the base station, in which the first scheduling period configuration parameter includes a scheduling period determined for the terminal. The second scheduling period configuration sub-module 733 is configured to, when it is determined that the core network supports the third request information received by the third receiving sub-module 713, send third acknowledgement information indicating that the third request information is supported to the terminal, in which the third acknowledgement information carries a second scheduling period configuration parameter, and the second scheduling period configuration parameter includes the scheduling period determined for the terminal.

For working mechanisms of the third receiving sub-module 713, the first scheduling period configuration sub-module 723, and the second scheduling period configuration sub-module 733, reference is made to the description in the embodiment corresponding to FIG. 4, which will not be described herein again.

The fourth receiving sub-module 714 is configured to receive fourth request information that is sent by the terminal and requests lowering an upper limit of transmit power, in which the fourth request information carries an upper transmit power limit value requested by the terminal. The first transmit power configuration sub-module 724 is configured to, when it is determined that the core network supports the fourth request information received by the fourth receiving sub-module 714, send a first transmit power configuration parameter indicating that the low power consumption request is supported to the base station, in which the first transmit power configuration parameter includes the number of resending times increased for the terminal and an upper transmit power limit value determined for the terminal. The second transmit power configuration sub-module 734 is configured to, when it is determined that the core network supports the fourth request information received by the fourth receiving sub-module 714, send fourth acknowledgement information indicating that the fourth request information is supported to the terminal, in which the fourth acknowledgement information carries a second transmit power configuration parameter, and the second transmit power configuration parameter includes the number of resending times increased for the terminal and the upper transmit power limit value determined for the terminal.

For working mechanisms of the fourth receiving sub-module 714, the first transmit power configuration sub-module 724, and the second transmit power configuration sub-module 734, reference is made to the description in the embodiment corresponding to FIG. 5, which will not be described herein again.

The fifth receiving sub-module 715 is configured to receive fifth request information that is sent by the terminal and requests residing in a cell forward access channel state. The first resident channel configuration sub-module 725 is configured to, when it is determined that the core network supports the fifth request information received by the fifth receiving sub-module 715, send a first resident channel configuration parameter indicating that the low power consumption request is supported to the base station, in which the first resident channel parameter includes notification information that the terminal resides in the cell forward access channel state. The second resident channel configuration sub-module 735 is configured to, when it is determined that the core network supports the fifth request information received by the fifth receiving sub-module 715, send fifth acknowledgement information indicating that the fifth request information is supported to the terminal, in which the fifth acknowledgement information carries a second resident channel configuration parameter, and the second resident channel configuration parameter includes fifth instruction information instructing the terminal to reside in the cell forward access channel state.

For working mechanisms of the fifth receiving sub-module 715, the first resident channel configuration sub-module 725, and the second resident channel configuration sub-module 735, reference is made to the description in the embodiment corresponding to FIG. 6, which will not be described herein again.

In this embodiment, after the terminal actively initiates a low power consumption request to the network side, the network side configures parameters, according to various low power consumption requests of different terminal users, corresponding to the low power consumption requests for the terminal and the base station to which the terminal belongs, so as to provide services with different power consumption for different terminals. In this way, power consumption caused by communication between the terminal and the network can be reduced according to the terminal's selection.

Figure 10:
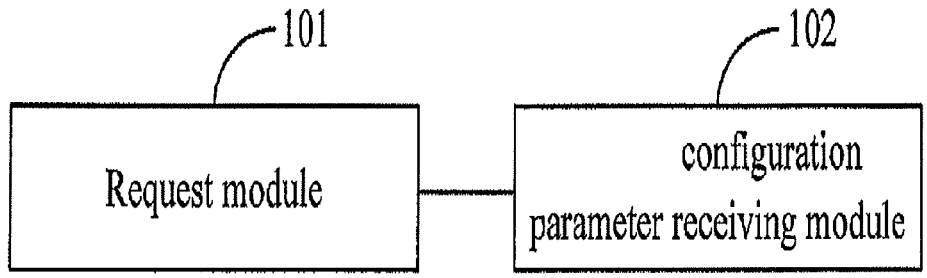
FIG. 10 is a schematic structural diagram of Embodiment 1 of a terminal in the present disclosure.

FIG. 10 is a schematic structural diagram of Embodiment 1 of a terminal in the present disclosure. As shown in FIG. 10, this embodiment includes a request module 101 and a configuration parameter receiving module 102.

The request module 101 is configured to send a low power consumption request to a core network. The configuration parameter receiving module 102 is configured to receive acknowledgement information that is sent by the core network and indicates that the low power consumption request is supported, in which the acknowledgement information carries a configuration parameter, so that the terminal performs low power consumption communication with a base station according to the configuration parameter.

Specifically, after the request module 101 sends the low power consumption request to the core network, if the core network determines to support the low power consumption request, the configuration parameter receiving module 102 receives acknowledgement information that is sent by the core network and indicates that the low power consumption request is supported, in which the acknowledgement information carries the configuration parameter. If the configuration parameter receiving module 102 receives the acknowledgement information, it indicates that the core network supports the low power consumption request, and the terminal subsequently performs low power consumption communication with the base station according to second configuration parameter.

In this embodiment, the request module sends a low power consumption request to the core network, so that the core network provides a required low power consumption service for the terminal according to the terminal's selection, thereby reducing power consumption caused by communication between the terminal and the network.

Figure 11:
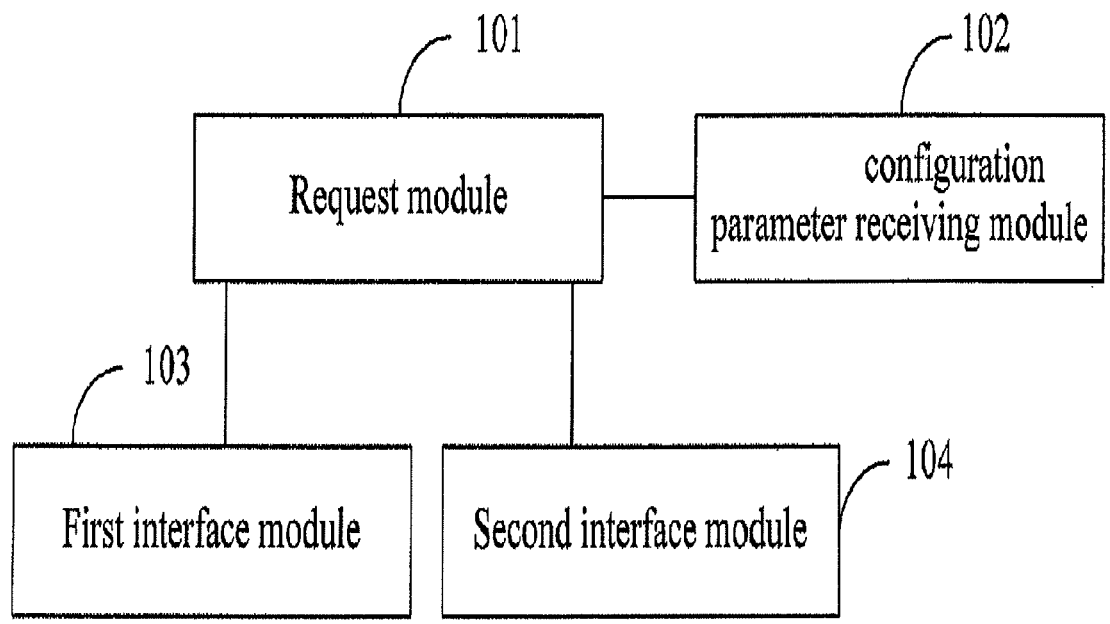
FIG. 11 is a schematic structural diagram of Embodiment 2 of the terminal in the present disclosure.

To enable a user of the terminal to select a low power consumption working mode of the terminal conveniently, as shown in FIG. 11, based on the aforementioned solutions, the terminal further includes a first interface module 103 and a second interface module 104. FIG. 11 is a schematic structural diagram of Embodiment 2 of the terminal in the present disclosure.

The first interface module 103 is configured to provide the user of the terminal with an interface used for setting a low power consumption parameter value, and send, to the request module 101, a low power consumption request corresponding to the low power consumption parameter value set by the user of the terminal. The second interface module 104 is configured to provide the user of the terminal with an interface used for selecting a low power consumption mode, and send, to the request module 101, a low power consumption request corresponding to the low power consumption mode s elected by the user of the terminal.

The terminal provides, through the first interface module 103, a user with an interface used for selecting a power consumption mode, and a specific parameter value of requesting low power consumption, for example, a setting value of a paging period, a setting value of a fixed interval scheduling period, or the like, is given on the interface.

For a user unfamiliar with communications technologies, the terminal provides a power consumption mode selection interface through the second interface module 104. For example, three modes including a low power consumption mode, a relatively low power consumption mode, and an extremely low power consumption mode are provided on the interface, and specific standby time, working time, power consumption, and other values in the three modes are given, in which the values may be calculated by exchanging specific parameter configuration of low power consumption, for example, a length of a paging period, between the terminal and a network device. Moreover, a prompt is given to the user that service performance of the terminal is degraded if the terminal is selected to work in this mode. After relevant parameters of a low power consumption request are selected, the terminal sends the low power consumption request to the core network through signaling.

Figure 12:
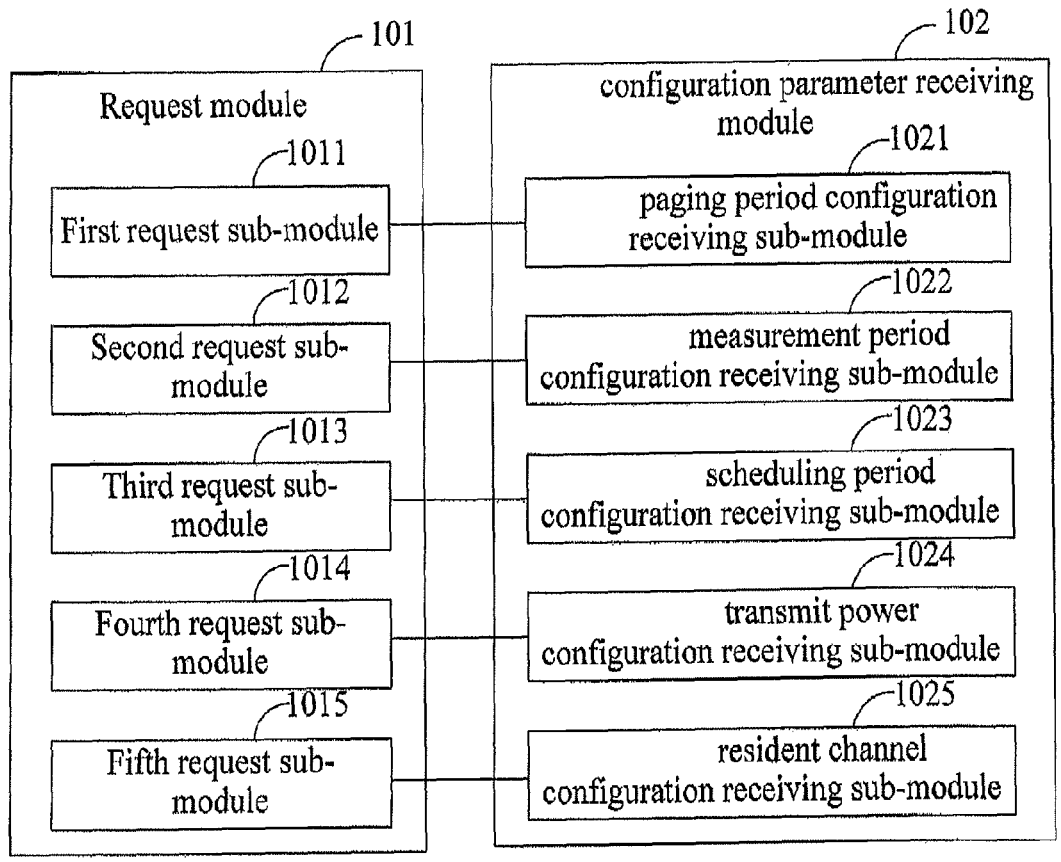
FIG. 12 is a schematic structural diagram of Embodiment 3 of the terminal in the present disclosure.

FIG. 12 is a schematic structural diagram of Embodiment 3 of the terminal in the present disclosure. As shown in FIG. 12, the request module 101 in FIG. 10 or FIG. 11 includes: a first request sub-module 1011, a second request sub-module 1012, a third request sub-module 1013, a fourth request sub-module 1014, and a fifth request sub-module 1015.

As shown in FIG. 12, the configuration parameter receiving module 102 in FIG. 10 or FIG. 11 includes: a paging period configuration receiving sub-module 1021, a measurement period configuration receiving sub-module 1022, a scheduling period configuration receiving sub-module 1023, a transmit power configuration receiving sub-module 1024, and a resident channel configuration receiving sub-module 1025.

The first request sub-module 1011 is configured to send first request information requesting extending a paging period to the core network, in which the first request information carries a paging period requested by the terminal. The paging period configuration receiving sub-module 1021 is configured to, when the core network supports the first request information, receive a paging period configuration parameter sent by the core network, in which the paging period configuration parameter includes a paging period determined for the terminal.

The second request sub-module 1012 is configured to send second request information requesting providing a current cell type or a measurement period for the terminal to the core network. The measurement period-configuration receiving sub-module 1022 is configured to, when the core network supports the second request information sent by the second request sub-module 1012, receive a measurement period configuration parameter sent by the core network, in which the measurement period configuration parameter includes third instruction information instructing the terminal to select a measurement period according to a current type provided by the base station or fourth instruction information instructing the terminal to configure a measurement period according to the measurement period provided by the base station.

The third request sub-module 1013 is configured to send third request information requesting extending a scheduling period to the core network, in which the scheduling period is a time interval at which the core network schedules the terminal to send data or a time interval at which the core network schedules the terminal to receive data, and the third request information carries a scheduling period requested by the terminal. The scheduling period configuration receiving sub-module 1023 is configured to, when the core network supports the third request information received by the third request sub-module 1013, receive a scheduling period configuration parameter sent by the core network, in which the scheduling period configuration parameter includes a scheduling period determined for the terminal.

The fourth request sub-module 1014 is configured to send fourth request information requesting lowering an upper limit of transmit power to the core network, in which the fourth request information carries an upper transmit power limit value requested by the terminal. The transmit power configuration receiving sub-module 1024 is configured to, when the core network supports the fourth request information sent by the fourth request sub-module 1014, receive a transmit power configuration parameter sent by the core network, in which the transmit power configuration parameter includes the number of resending times increased for the terminal and an upper transmit power limit value determined for the terminal.

The fifth request sub-module 1015 is configured to send fifth request information requesting residing in a cell forward access channel state to the core network. The second resident channel configuration receiving sub-module 1025 is configured to, when the core network supports the fifth request information sent by the fifth request sub-module 1015, receive a second resident channel configuration parameter sent by the core network, in which the second resident channel configuration parameter includes fifth instruction information instructing the terminal to reside in the cell forward access channel state.

In the terminal of this embodiment, the request module sends a low power consumption request to the core network, so that the core network provides a required low power consumption service for the terminal according to the terminal's selection, thereby reducing power consumption caused by communication between the terminal and the network.

Figure 13:
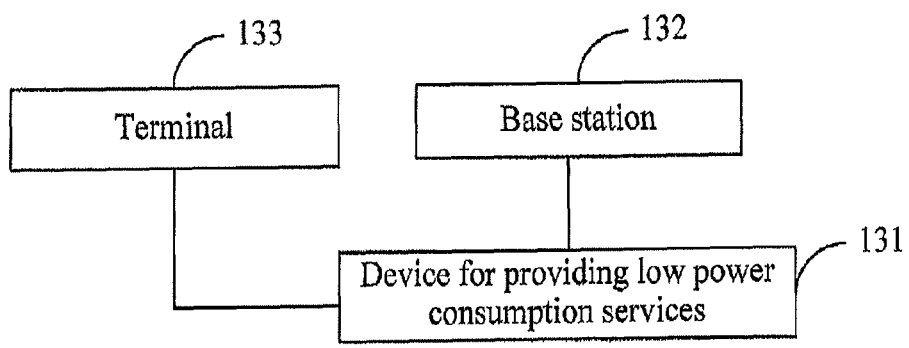
FIG. 13 is a schematic structural diagram of an embodiment of a communication system in the present disclosure.

FIG. 13 is a schematic structural diagram of an embodiment of a communication system in the present disclosure. As shown in FIG. 13, this embodiment includes a device 131 for providing low power consumption services, a base station 132, and a terminal 133. The device 131 for providing low power consumption services is a device in a core network, and may be the device for providing low power consumption services in the embodiment corresponding to FIG. 7, FIG. 8, or FIG. 9. The terminal 133 may be the terminal in the embodiment corresponding to FIG. 10, FIG. 11, or FIG. 12. The base station 132 is configured to receive a first configuration parameter which is sent by the device 131 for providing low power consumption services and which indicates that a low power consumption request is supported, so that the base station 132 supports the low power consumption request of the terminal 133.

In this embodiment, after the terminal actively initiates a low power consumption request to the device for providing low power consumption services, the device for providing low power consumption services configures, according to low power consumption requests of different terminal users, parameters corresponding to the low power consumption requests for the terminal and the base station to which the terminal belongs, so as to provide services with different power consumption for different terminals. In this way, power consumption caused by communication between the terminal and the network can be reduced according to the terminal's selection.

Persons of ordinary skill in the art should understand that all or a part of the steps of the embodiments of the method may be implemented by a program instructing relevant hardware such as at least one hardware processor. The program may be stored in a computer readable storage medium accessible to the at least one hardware processor. When the program runs, the steps of the embodiments of the method are performed by the at least one hardware processor. The storage medium may be any medium that is capable of storing program codes, such as a ROM, a RAM, a magnetic disk, or an optical disk.

Finally, it should be noted that the above embodiments are merely provided for describing the solutions of the present disclosure, but not intended to limit the present disclosure. It should be understood by persons of ordinary skill in the art that although the present disclosure has been described in detail with reference to the foregoing embodiments, modifications can be made to the solutions described in the foregoing embodiments, or equivalent replacements can be made to some features in the solutions, as long as such modifications or replacements do not cause the essence of corresponding solutions to depart from the idea and scope of the solutions in the embodiments of the present disclosure.

What is claimed is:

1. A method for providing low power consumption services, comprising:
   receiving a low power consumption request sent by a terminal;
   when determining that the low power consumption request is supported, sending a first configuration parameter indicating that the low power consumption request is supported to a base station, so that the base station performs low power consumption communication with the terminal according to the first configuration parameter;
   sending acknowledgement information indicating that the low power consumption request is supported to the terminal, wherein the acknowledgement information carries a second configuration parameter, so that the terminal performs low power consumption communication with the base station according to the second configuration parameter.

2. The method according to claim 1, further comprising:
   when determining that the low power consumption request is not supported, sending request failure information to the terminal to notify the terminal that a core network does not support the low power consumption request.

3. T-he method according to claim 1, wherein the low power consumption request comprises at least one of the following information:
   first request information requesting extending a paging period, wherein the first request information carries a paging period requested by the terminal;
   second request information requesting providing a current cell type or a measurement period for the terminal;
   third request information requesting extending a scheduling period, wherein the scheduling period is a time interval at which a network schedules the terminal to send data or a time interval at which a network schedules the terminal to receive data, and the third request information carries a scheduling period requested by the terminal;

fourth request information requesting lowering an upper limit of transmit power, wherein the fourth request information carries an upper transmit power limit value requested by the terminal;

fifth request information requesting residing in a cell forward access channel state.

4. The method according to claim 3, wherein when the low power consumption request comprises the first request information, the first configuration parameter comprises: a paging period determined for the terminal; and the second configuration parameter comprises: the paging period determined for the terminal;

wherein when the low power consumption request comprises the second request information, the first configuration parameter comprises: first instruction information instructing the base station to provide the current cell type for the terminal in a broadcast message, or second instruction information instructing the base station to provide the measurement period for the terminal; and the second configuration parameter comprises: third instruction information instructing the terminal to select a measurement period according to the current cell type provided by the base station, or fourth instruction information instructing the terminal to configure a measurement period according to the measurement period provided by the base station;

wherein when the low power consumption request comprise the third request information, the first configuration parameter comprises: a scheduling period determined for the terminal and a capacity of a data buffer area increased for the terminal, and an amount of sent data increased in a single burst; and the second configuration parameter comprises: the scheduling period determined for the terminal;

wherein when the low power consumption request comprises the fourth request information, the first configuration parameter comprises: the number of resending times increased for the terminal, and an upper transmit power limit value determined for the terminal; and the second configuration parameter comprises: the number of resending times increased for the terminal, and the upper transmit power limit value determined for the terminal; and wherein when the low power consumption request comprises the fifth request information, the first configuration parameter comprises: notification information that the terminal resides in the cell forward access channel state; and the second configuration parameter comprises fifth instruction information instructing the terminal to reside in the cell forward access channel state.

5. A device having a processor, comprising:
a receiving module, configured to receive a low power consumption request sent by a terminal;
a first configuration module, configured to, when it is determined that the low power consumption request is supported, send a first configuration parameter indicating that the low power consumption request is supported to a base station, so that the base station performs low power consumption communication with the terminal according to the first configuration parameter; and
a second configuration module, configured to, when it is determined that the low power consumption request is supported, send acknowledgement information indicating that the low power consumption request i-s supported to the terminal, wherein the acknowledgement information carries a second configuration parameter, so that the terminal performs low power consumption communication with the base station according to the second configuration parameter.

6. The device according to claim 5, further comprising:
a sending module, configured to, when it is determined that the low power consumption request is not supported, send request failure information to the terminal to notify the terminal that a core network does not support the low power consumption request.

7. The device according to claim 6, wherein the receiving module comprises:
a first receiving sub-module, configured to receive first request information that is sent by the terminal and requests extending a paging period, wherein the first request information comprises a paging period requested by the terminal; or
a second receiving sub-module, configured to receive second request information that is sent by the terminal and requests providing a current cell type or a measurement period for the terminal; or
a third receiving sub-module, configured to receive third request information that is sent by the terminal and requests extending a scheduling period, wherein the scheduling period is a time interval at which a network side schedules the terminal to send data or a time interval at which the network side schedules the terminal to receive data, and the third request information carries a scheduling period requested by the terminal; or
a fourth receiving sub-module, configured to receive fourth request information that is sent by the terminal and requests lowering an upper limit of transmit power, wherein the fourth request information carries an upper transmit power limit value requested by the terminal; or
a fifth receiving sub-module, configured to receive fifth request information that is sent by the terminal and requests residing in a cell forward access channel state.

8. The device according to claim 7, wherein the first configuration module comprises one of the following:
a first paging period configuration sub-module, configured to, when it is determined that the first request information is supported, send a first paging period configuration parameter indicating that the first request information is supported to the base station, wherein the first paging period configuration parameter comprises a paging period determined for the terminal;
a first measurement period configuration sub-module, configured to, when it is determined that the second request information is supported, send a first measurement period configuration parameter indicating that the second request information is supported to the base station, wherein the first measurement period configuration parameter comprises first instruction information instructing the base station to provide the current cell type for the terminal in a broadcast message or second instruction information instructing the base station to provide the measurement period for the terminal;
a first scheduling period configuration sub-module, configured to, when it is determined that the third request information is supported, send a first scheduling period configuration parameter indicating that the third request information is supported to the base station, wherein the first scheduling period configuration parameter comprises a scheduling period determined for the terminal;
a first transmit power configuration sub-module, configured to, when it is determined that the fourth request information is supported, send a first transmit power configuration parameter indicating that the fourth request information is supported to the base station, wherein the first transmit power configuration parameter comprises the number of resending times increased for the terminal and an upper transmit power limit value determined for the terminal; and a first resident channel configuration sub-module, configured to, when it is determined that the fifth request information is supported, send a first resident channel configuration parameter indicating that the fifth request information is supported to the base station, wherein the first resident channel configuration parameter comprises notification information that the terminal resides in the cell forward access channel state.

9. The device according to claim 8, wherein the second configuration module comprises one of the following:

a second paging period configuration sub-module, configured to send first acknowledgement information indicating that the first request information is supported to the terminal, wherein the first acknowledgement information carries a second paging period configuration parameter, and the second paging period configuration parameter comprises the paging period determined for the terminal;

a second measurement period configuration sub-module, configured to send second acknowledgement information indicating that the second request information is supported to the terminal, wherein the second acknowledgement information carries a second measurement period configuration parameter, and the second measurement period configuration parameter comprises third instruction information instructing the terminal to select a measurement period according to the current cell type provided by the base station or fourth instruction information instructing the terminal to configure a measurement period according to the measurement period provided by the base station;

a second scheduling period configuration sub-module, configured to send third acknowledgement information indicating that the third request information is supported to the terminal, wherein the third acknowledgement information carries a second scheduling period configuration parameter, and the second scheduling period configuration parameter comprises the scheduling period determined for the terminal;

a second transmit power configuration sub-module, configured to send fourth acknowledgement information indicating that the fourth request information is supported to the terminal, wherein the fourth acknowledgement information carries a second transmit power configuration parameter, and the second transmit power configuration parameter comprises the number of resending times increased for the terminal and the upper transmit power limit value determined for the terminal; and a second resident channel configuration sub-module, configured to send fifth acknowledgement information indicating that the fifth request information is supported to the terminal, wherein the fifth acknowledgement information carries a second resident channel configuration parameter, and the second resident channel configuration parameter comprises fifth instruction information instructing the terminal to reside in the cell forward access channel state.

10. A terminal having a processor, comprising:

a request module, configured to s-end a low power consumption request to a core network wherein the low power consumption request comprises a user selectable working mode; and a configuration parameter receiving module, configured to, when the core network supports the low power consumption request, receive acknowledgement information that is sent by the core network and indicates that the low power consumption request is supported, wherein the acknowledgement information carries a configuration parameter, so that the terminal performs low power consumption communication with a base station according to the configuration parameter wherein the terminal comprises one of the following:

a first interface module, configured to provide a user of the terminal with an interface used for setting a low power consumption parameter value, and send, to the request module, a low power consumption request corresponding to the low power consumption parameter value set by the user of the terminal; and a second interface module, configured to provide a user of the terminal with an interface used for selecting a low power consumption mode, and send, to the request module, a low power consumption request corresponding to the low power consumption mode selected by the user of the terminal.

11. The terminal according to claim 10, wherein the request module comprises one of the following:

a first request sub-module, configured to send first request information requesting extending a paging period to the core network, wherein the first request information carries a paging period requested by the terminal;

a second request sub-module, configured to send second request information requesting providing a current cell type or a measurement period for the terminal to the core network;

a third request sub-module, configured to send third request information requesting extending a scheduling period to the core network, wherein the scheduling period is a time interval at which a network schedules the terminal to send data or a time interval at which the network schedules the terminal to receive data, and the third request information carries a scheduling period requested by the terminal;

a fourth request sub-module, configured to send fourth request information requesting lowering an upper limit of transmit power to the core network, wherein the fourth request information carries an upper transmit power limit value requested by the terminal; and a fifth request sub-module, configured to s-end fifth request information requesting residing in a cell forward access channel state to the core network.

12. The terminal according to claim 11, wherein the configuration parameter receiving module comprises one of the following:

a paging period configuration receiving sub-module, configured to, when the core network supports the first request information, receive a paging period configuration parameter sent by the core network, wherein the paging period configuration parameter comprises a paging period determined for the terminal;

a measurement period configuration receiving sub-module, configured to, when the core network supports the second request information, receive a measurement period configuration parameter sent by the core network, wherein the measurement period configuration parameter comprises third instruction information instructing the terminal to select a measurement period according to the current cell type provided by the base station or fourth instruction information instructing the terminal to configure a measurement period according to the measurement period provided by the base station;

a scheduling period configuration receiving sub-module, configured to, when the core network supports the third request information, receive a scheduling period configuration parameter sent by the core network, wherein the scheduling period configuration parameter comprises a scheduling period determined for the terminal;

a transmit power configuration receiving sub-module, configured to, when the core network supports the fourth request information, receive a transmit power configuration parameter sent by the core network, wherein the transmit power configuration parameter comprises the number of resending times increased for the terminal and an upper transmit power limit value determined for the terminal; and a resident channel configuration receiving sub-module, configured to, when the core network supports the fifth request information, receive a resident channel configuration parameter sent by the core network, wherein the resident channel configuration parameter comprises fifth instruction information instructing the terminal to reside in the cell forward access channel state.

* * * * *